Sept. 23, 1952 R. E. SAMUELSON 2,611,858
TUNING APPARATUS FOR ELECTRONIC EQUIPMENT
Filed April 22, 1948
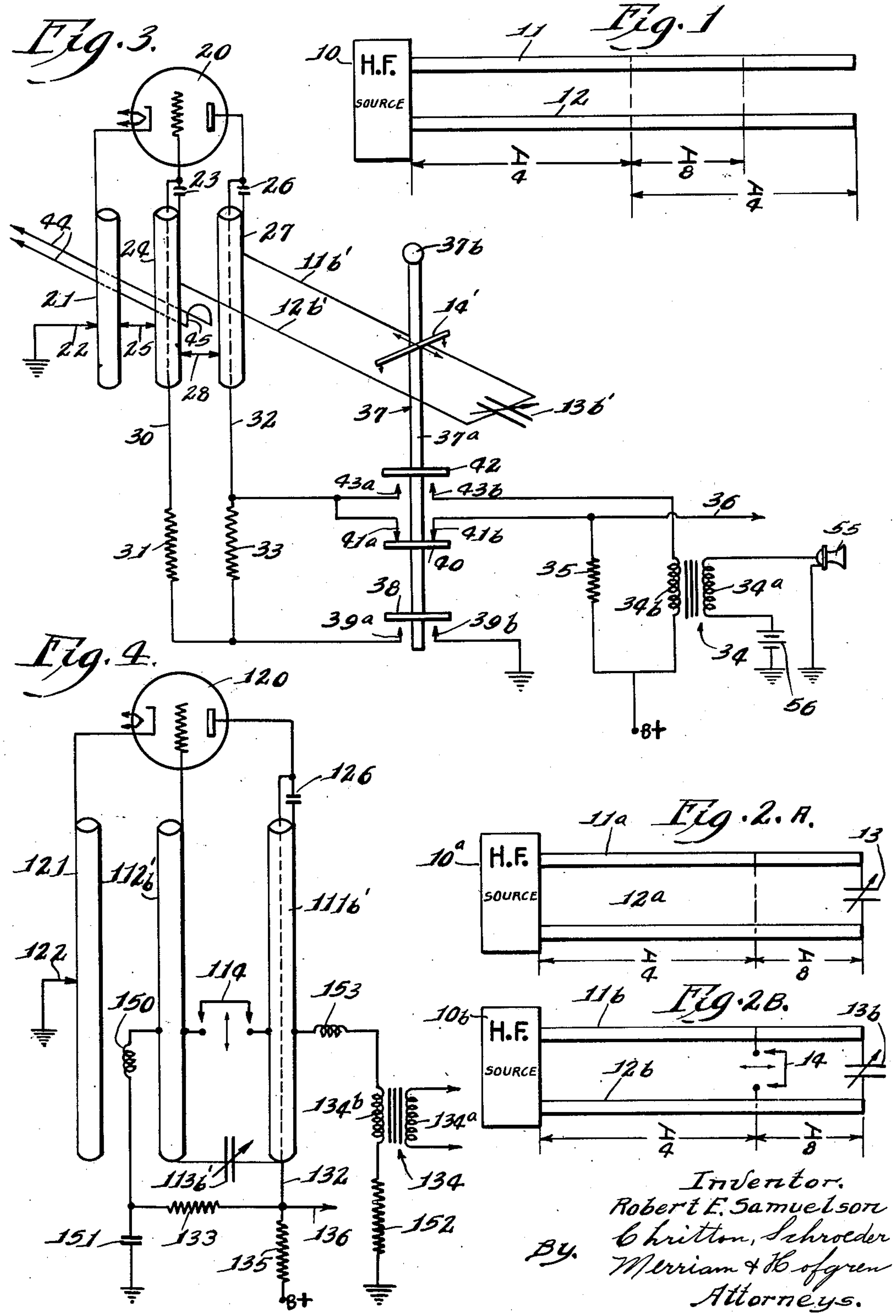
Fig. 3. Fig. 1 Fig. 4. Fig. 2. A. Fig. 2B.
Inventor.
Robert E. Samuelson
By Britton, Schroeder
Merriam & Hofgren
Attorneys.

Patented Sept. 23, 1952

2,611,858

UNITED STATES PATENT OFFICE 2,611,858

TUNING APPARATUS FOR ELECTRONIC EQUIPMENT

Robert E. Samuelson, Chicago, Ill., assignor to The Hallicrafters Co., a corporation of Illinois Application April 22, 1948, Serial No. 22,545

8 Claims. (Cl. 250—13)

This invention relates to tuning apparatus for electronic equipment, and more particularly to tuning apparatus for transceivers.

One feature of this invention is that it provides improved tuning apparatus; another feature of this invention is that it provides a transceiver having means for switching between transmitting and receiving conditions so that said transceiver may operate on predetermined frequencies which may or may not be the same when in respective transmitting and receiving conditions; a further feature of this invention is that it provides a transceiver having means for switching between transmitting and receiving conditions, said transceiver being tunable when in one of said conditions independently of and without affecting the operating frequency in the other of said conditions; yet a further feature of this invention is that it provides a transceiver having switching means operated by a single control for switching between transmitting and receiving conditions, so that said transceiver may operate on predetermined different frequencies in said respective conditions; still another feature of this invention is that it provides a transceiver having a resonant circuit comprising a section of a wave transmission system having only distributed parameters and means for switching said transceiver between transmitting and receiving conditions, said switching means including a device for changing the active length of said section.

Other features and advantages of this invention will be apparent from the following specification and from the drawings in which:

Fig. 1 is a diagrammatic representation of a half wavelength parallel conductor transmission line section;

Fig. 2A is a diagrammatic representation of a three-eighths wavelength parallel conductor transmission line section terminating in a variable reactive load;

Fig. 2B is a diagrammatic representation of a transmission line section similar to Fig. 2A, but having a shorting switch operable to change the active length of the line;

Fig. 3 is a diagrammatic illustration of a transceiver embodying the invention; and Fig. 4 is a diagrammatic illustration of a transceiver embodying the invention in a modified form.

A common type of combination transmitter-receiver known as a "transceiver" includes a tube adapted to oscillate and having associated therewith a resonant circuit which in turn is coupled to an antenna. In order to transmit, keying or other modulating means are associated with the tube in such manner that the oscillations developed by the tube and radiated from the antenna include variations representing the intelligence being transmitted. In order to receive, the apparatus is used as an oscillating detector, usually of the super-regenerative type, and the received and demodulated signal is delivered by suitable audio circuits to a loudspeaker, headset, or other transducer. The invention here being disclosed is particularly described in connection with such electronic apparatus.

Suitable switching means are provided for switching the apparatus between transmitting and receiving conditions. In conventional transceivers this switching means (which may comprise one or more manually operated switches or electrically operated relays) generally changes operating potentials as well as the connections to the modulating apparatus and audio circuits. However, this switching means heretofore has made no change in the resonant circuit which controls the operating frequency of the transceiver.

A disadvantage of such a transceiver is that the apparatus is adapted to transmit and receive only on a single frequency, and there has been difficulty in maintaining this frequency during change-over. Of course, the operating frequency may be changed when the transceiver is not operating so that the transceiver will operate on different preset frequencies, but it has not heretofore been possible to transmit on one frequency and to receive on a predetermined considerably different frequency, or to tune during reception, without affecting the frequency at which the circuit is resonant when the transceiver is in transmitting condition, independent tuning of transmitting and receiving frequencies having been impossible. Despite the use of a single tuned circuit, the transmitting frequency and the receiving frequency have heretofore been slightly different, despite all efforts to the contrary, due to differences in operating potentials, to the effects of super-regeneration, etc., so that the transceiver is inefficient in that it is not properly tuned for either transmission or reception or both.

I have invented and herewith am disclosing and claiming tuning apparatus for electronic equipment which permits such equipment, as for example a transceiver, to be preset to a given operating frequency as has been done in the past, and which further permits tuning of the transceiver in one of its operating conditions independently of and without affecting the frequency of operation in the other of said conditions. In practice with my apparatus the operating frequency of a transceiver may be preset to provide a predetermined transmitting frequency, and when the transceiver is switched to its receiving condition the transceiver may be tuned over a frequency range which preferably includes the preset transmitting frequency independently of and without affecting the frequency at which the transceiver will operate if switched back to transmitting condition. Furthermore, I have provided an arrangement whereby a single control may be utilized to perform the entire switching operation between transmitting and receiving conditions, including the change in operating frequencies as above described.

Referring now to the drawings, Fig. 1 shows diagrammatically an open ended half wave length section of a wave transmission system having only distributed parameters connected to a high frequency source 10. While the line is illustrated as comprising parallel conductors 11 and 12, it will be understood that other forms of lines, as for example coaxial lines may be utilized if desired. Furthermore, while the terms "half wavelength," "quarter wavelength," "three-eighth wavelength," etc. are used throughout this specification and claims, it is to be understood that these terms do not necessarily refer to the absolute length of the transmission line section, but rather refer only to the terminal portion of such section, and all of the transmission line sections illustrated herein might comprise any number of half wavelengths between the high frequency source and the portion of the line illustrated. In Fig. 1, for example, while the line is illustrated as comprising only a single half wavelength section from the high frequency source 10, the electrical operation would be the same if there were one or more half wavelength sections between the portion illustrated and the high frequency source, so long as the line terminates in a half wavelength section. Furthermore, obviously the line comprises a half wave section only at a predetermined or given frequency. For different frequencies the physical length of the line would be different.

As is well understood in the art a half wavelength transmission line section may be utilized as a resonant circuit, and an open ended half wavelength transmission line section is the equivalent of a parallel tuned circuit, the input impedance appearing to the source as a very high resistance. If the dielectric surrounding the conductors were a perfect insulator, and if the conductive properties of the material from which the line was made were perfect, the input impedance would be infinite, and would be purely resistive.

It has been found to be very advantageous at high and ultra-high frequencies to use a transmission line section as a resonant circuit. As the operating frequencies become higher, it progressively becomes more difficult to obtain satisfactory selectivity and the proper high impedance from a conventional resonant circuit comprising a coil and a condenser. On the other hand, as the frequencies increase, fractional wavelength sections of wave transmission systems (parallel conductors or concentric conductors) are not only more efficient from an electrical standpoint, but become of practical dimensions since, as the frequency increases, the wavelength decreases.

As is well understood in the art the action of a quarter wavelength transmission line section shorted at one end is similar to that of an open ended half wavelength section, and in both cases the high frequency source looks into a parallel resonant circuit having high input impedance which theoretically is purely resistive.

If the length of an open ended section is increased or decreased by an amount less than one-quarter wavelength the input impedance will remain high, but will become reactive in character, this change in impedance appearing as an inductive reactance if the line is made shorter than shown in Fig. 1, and appearing as a capacitive reactance if the line is made longer than as shown in Fig. 1. A fractional wavelength transmission line section which has a length between a quarter and a half wavelength at the operating frequency, or which has a length between a half and three-quarters wavelength at the operating frequency, may be made to have an input impedance identical with that of a half wavelength open ended section if said fractional wavelength section is terminated in a reactive load having a reactance equal to but of opposite characteristics than the reactive character of the input impedance of said open ended fractional section. For example, if a fractional wavelength section between a half and three-quarters wavelength long is terminated in a reactive load having an inductive reactance equal to the capacitive reactance which appears to the input when said fractional section is open ended, the fractional section will have a high input impedance which theoretically is purely resistive similar to an open ended half wavelength section. Similarly if a fractional wavelength section between a quarter and a half wavelength long is terminated in a reactive load having a capacitive reactance equal to the inductive reactance which appears to the input when said fractional section is open ended, the fractional section will have a high input impedance which theoretically is purely resistive similar to an open ended half wavelength section.

I have found it preferable to utilize a three-eighths wavelength section rather than some other fractional section since, at the high frequencies which are generally employed it is more practical to terminate such a transmission line section in a capacitive load than it is to terminate such a section in an inductive load; and furthermore a three-eighths wavelength section is preferable over any other fractional section between a quarter and a half wavelength long because the inductive component of the input impedance of a three-eighths wavelength section is lower than in any other such fractional section and is equal to the characteristic or "surge" impedance of the line. This characteristic impedance in each case depends upon the dimensions and spacing of the conductors which comprise the line and the dielectric constant of the insulating material surrounding the conductors. Since the inductive component of the input impedance of a three-eighths wavelength section is lower than in any other fractional section between a quarter and a half wavelength long, it is possible to terminate the line in a very small capacitance, and if the capacitance is made variable so that at some point in its range of variation it has a capacitive reactance at the operating frequency equal to the characteristic impedance of the line, a relatively wide tuning range on either side of the operating frequency will be provided.

In Fig. 2A a line is shown similar to that of Fig. 1, but having a length equal to three-eighths of a wavelength, and parallel conductors 11*a* and 12*a* which comprise the line are coupled at one end to a high frequency source 10*a*, while the section is terminated in a reactive load comprising a variable capacitance 13.

In Fig. 2B similar three-eighths wavelength parallel conductors 11b and 12b are coupled to a high frequency source 10b and are terminated in a reactive load comprising a condenser 13b, and a switching device 14 is provided for shorting the resonant section to change the active length thereof to a quarter wavelength. The device 14 may comprise a conventional shorting bar when used in conjunction with a line formed of parallel conductors, and while the point of connection of the shorting bar from the ends of the conductors is shown as being fixed, it will be understood that in practice the shorting bar would be slidable along the conductors in order that the point of connection may be preset to a point a quarter wavelength from the high frequency source at any given operating frequency. As noted above the electrical characteristics of a quarter wavelength shorted section are similar to those of a half wavelength open ended section and to a three-eighths wavelength section terminated in a capacitive load of the proper value.

The capacitance 13 is shown to be variable, and varying this capacitance will have the same effect on the input impedance of the line as altering the physcial length of a half wavelength line. Thus when the capacitive reactance of the load 13 is of the order of the characteristic impedance of the three-eighths wavelength line the capacitive reactance balances the inductive component of the input impedance and the resonant transmission line section has a high purely resistive input impedance and appears to the high frequency source as an open ended half wavelength line (or as a shorted quarter wavelength line) at the fresuency at which the shorting bar 14 is preset. If the switch 14 is open and the capacitive reactance is reduced from this value the input impedance appears to be inductive in character just as if the half wavelength line were physically shortened and the line is resonant at a higher freqency; and if the capacitive reactance is increased the input impedance appears to be capacitive in character just as if the half wavelength line were physically lengthened and the line is resonant at a lower frequency so that the resonant section of Fig. 2B is tunable over a band of frequencies so long as the shorting switch 14 is open. If such switch is closed, however, the active length of the line is changed to a shorted quarter wavelength and the capacitance 13b is rendered ineffective.

In electronic apparatus utilizing the invention, the terminals of a transmission line section similar to that shown in Fig. 2B may be coupled to another tuned circuit to provide a variable shunt reactance of high value tunable through resonance; or alternatively the resonant section of Fig 2B may be used itself as the complete resonant circuit tunable over a band of frequencies. In either case the variable reactive load which terminates the transmission line section is utilized, in one operating condition, for tuning the electronic apparatus with which it is associated.

In Fig. 3 the invention is illustrated as utilizing a transmission line section of the type shown in Fig. 2B coupled to the oscillating circuit of a conventional transceiver. The transmitting frequency may be preset with the short circuiting switch device 14 closed. When the transceiver is switched to receiving condition the short circuit is removed, and the receiving frequency may then be tuned by varying the capacitance 13 in either direction from its "normal" value, which would normally be about the mid-point of the range over which it is variable, sometimes hereinafter termed its "partial-reactance." Since this normal partial value is preferably arranged to provide a capacitive reactance of the order of the characteristic impedance of the transmission line section so that it balances the inductive component of the input impedance, the transceiver may be tuned, when in receiving condition, to receive a band of frequencies on either side of the transmitting frequency without affecting the frequency at which the transceiver operates when in transmitting position; or it may be accurately tuned to the transmission frequency despite differences in operating conditions caused by the changeover.

In Fig. 3 the transceiver comprises a tube 20 which may be a triode of tube type No. 6F4 having cathode, grid and anode elements. The cathode is indirectly heated by means of a filament which may be connected to a voltage source of proper value in conventional manner, although a tube having a filamentary cathode, as for example a tube of tube type No. 958, might be used if desired. The cathode is connected to a conductor 21 which is grounded by means of a slider 22. The conductor 21 may comprise a cylindrical rod of conducting material, preferably having its active surfaces of copper, silver or other highly conductive material. The grid of the tube 20 is coupled through a D. C. blocking condenser 23 to a conductor 24 which is arranged parallel with and is of similar construction to the conductor 21. A slidable shorting bar 25 between the conductors determines the active length thereof to provide a resonant grid-cathode circuit at the operating frequency. The anode of the tube 20 is coupled by a D. C. blocking condenser 26 to a conductor 27 which is arranged parallel with and is similar in construction to the conductors 21 and 24. A slidable shorting bar 28 between the conductors 24 and 27 determines the active length of such conductors to provide a resonant grid-anode circuit at the operating frequency. As is understood in the art, the operating frequency of the transceiver may be selected and preset by adjusting the grid-cathode resonant circuit by means of the shorting bar 25 and by adjusting the grid-anode resonant circuit by means of the shorting bar 28.

Circuit connections for providing operating voltages for the tube 20 may if desired lead through the hollow conductors 24 and 27, such connections being insulated from the conductors. As illustrated the grid of the tube 20 is connected to a lead 30 which extends through the conductor 24 to a relatively low value transmitting grid leak resistor 31, and the anode of the tube 20 is connected to a lead 32 which extends through the hollow conductor 27 to a voltage dropping resistor 33, which is of relatively high value, preferably having a resistance of the order of several megohms.

A transformer designated generally at 34 has a primary 34a which is connected to a conventional modulating circuit arrangement here illustrated as a microphone 55 energized by a battery 56. The secondary 34b of the transformer is adapted to be connected in the anode circuit of the tube 20 to provide plate modulation when the transceiver is in transmitting condition. Connections for utilizing received signals when the transceiver is in receiving condition comprise a plate load and voltage dropping resistor 35 which is adapted to be connected in the anode circuit when the transceiver is in receiving condition and which may be connected to a headset, speaker, or other transducer through a lead 36. One end of the transformer secondary 34b and the resistor 35 are connected to a source of anode or B+ voltage.

Switching means are provided for switching the transceiver between transmitting and receiving conditions. While this switching means may comprise relays or other types of switches, it is here shown as comprising a manually operated plunger type switch designated generally at 37 and having an insulating movable operating member 37a provided with a handle 37b. A plurality of switch members 38, 40 and 42 are on the operating member 37a, these switch members being of conducting material and acting in coordinated fashion so that a single control may be utilized for switching between transmitting and receiving conditions. A conducting switch member 38 on the operating member 37a and movable therewith is adapted to engage and bridge stationary switch contacts 39a and 39b. The contact 39a is connected to the resistors 31 and 33 while the contact 39b is connected to ground so that with the switch 37 in the position other than that illustrated one end of the resistors 31 and 33 is grounded.

Another movable switch member 40 is on the operating member 37, this switch member cooperating with stationary contacts 41a and 41b. The contact 41a is connected to the anode of the tube 20, while the contact 41b is connected to the audio utilization circuit and to the source of B+ voltage through the resistor 35.

A third movable switch member 42 on the operating member 37 is adapted to engage and bridge stationary switch contacts 43a and 43b, this latter switch being arranged in a manner similar to the switch member 38 so that when the operating member 37 is in raised position as illustrated with the movable switch member 40 in engagement with its cooperating contacts, the movable switch members 38 and 42 are moved away from their cooperating contacts to open the respective switches. The stationary contact 43a is connected in parallel with the contact 41a to the anode of the tube 20, and the stationary contact 43b is connected to the B+ supply through the modulating transformer.

High frequency signal carrying apparatus is coupled to the resonant output circuit of the transceiver, this signal carrying apparatus comprising a transmission line 44 which may be coupled to an antenna, and which is coupled to the grid-anode circuit by means of a "hairpin" coupling arrangement which may comprise a single loop 45 adjacent the conductors 24 and 27.

The operation of the transceiver described above is conventional. The sliding shorting bars 25 and 28 and the grounded sliding bar 22 may be adjusted to provide input and output circuits which are resonant at a given frequency. The transceiver is shown in receiving condition, B+ anode voltage being supplied from the source through the resistor 35, the switch contacts 41b and 41a and the lead 32. This arrangement provides the tube with an anode voltage which is lower than the source voltage because of the voltage drop across the resistor 35. The high resistance grid leak 33 in series with the low resistance 31 provides, in conjunction with grid condenser 23, a proper time constant for self-quenching action so that the transceiver operates as a super-regenerative amplifier and detector, the coupling between the grid-cathode and grid-anode circuits resulting in regeneration sufficient to cause the tube 20 to oscillate, while the circuit including resistors 33 and 31 and condenser 23 causes the tube periodically to cease oscillation at a relatively low quench frequency.

In the event it is desired to transmit, the switch 37 is operated so that the switching bars 38 and 42 bridge their respective cooperating contacts while the switch bar 40 is separated from its respective cooperating contacts. This action switches the secondary 34b of the modulating transformer 34 into the anode circuit, removes the voltage dropping resistor 35 and connects the resistors 31 and 33 to ground. Anode voltage is now at a higher value as the resistance of the transformer secondary 34b provides only a small voltage drop, and since the relatively low value grid leak 31 is now connected to ground, the tube 20 oscillates continually and may be anode modulated if desired. Energy in the resonant grid-anode circuit is coupled into the transmission line 44 and radiated from the antenna in conventional manner. While the operating frequency may be preset by means of the grounded slider 22 and the shorting bars 25 and 28, the apparatus so far described provides no means for independently changing the frequency at which the grid-anode circuit is resonant in receiving condition without also changing the frequency at which said circuit is resonant in transmitting condition, nor for tuning the transceiver when it is in receiving condition independently of and without affecting the operating frequency when the transceiver is in transmitting condition. Furthermore, because of the change in anode voltage between transmitting and receiving conditions and because of the ground connection of the grid leak resistor 31 during transmission, there would be a change in operating frequency between transmission and reception.

In order to overcome these disadvantages a second resonant circuit is here shown as coupled to the resonant grid-anode circuit of the tube. This second resonant circuit comprises a fractional wavelength section of a wave transmission system having only distributed parameters here shown as a three-eighths wavelength parallel conductor transmission line section similar to the transmission line section shown in Fig. 2B and designated in Fig. 3 by the reference characters 11b' and 12b'. At one end the parallel conductors 11b' and 12b' are illustrated as being tapped onto the oscillator grid-anode circuit at a suitable position, although it will be understood that other means of coupling, as for example a "hairpin," might be utilized if desired.

The other end of the second resonant circuit is terminated in a reactive load comprising a variable condenser 13b', and a shorting bar 14', located at the quarter wavelength position on the transmission line section, is carried by the switch operating member 37a. When the transceiver is in receiving condition as illustrated the shorting bar 14' is spaced from the conducting members 11b' and 12b' so that the frequency at which the transceiver is operable may be varied over a range by varying the capacitance 13b'. However, when the switch 37 is operated to switch the transceiver into transmitting position the shorting bar shorts an adjustable portion of the transmission line section and changes its active length to a quarter wavelength, thus completely shorting out the capacitance 13b'. As pointed out earlier in connection with the description of Fig. 2B, if the line is three-eighths wavelength long and is terminated in a reactive load having a capacitive partial-reactance of the order of the characteristic impedance of the line, the electrical characteristics of the line are equivalent to the characteristics of a quarter wavelength shorted line. Thus the transceiver may be preset, with the bar 14′ in shorting position, so that its grid-anode circuit is resonant at a predetermined operating frequency during transmission, and during reception said circuit, with the short removed, will be tunable independently of and without affecting the frequency at which said circuit is resonant when the transceiver is in transmitting condition. Furthermore, if the capacitance 13b′ is arranged to have a capacitive partial-reactance of the order of the characteristic impedance of the line which it terminates at the operating frequency, when in receiving condition the transceiver will be tunable throughout a range including the frequency at which the transceiver is operative when in transmitting condition.

In Fig. 4 a modified form of the invention is shown wherein a three-eighths wavelength transmission line section terminating in a reactive load and having switch means including a device for changing the effective length of the section is used directly as the complete resonant circuit associated with a grid-modulator transceiver. In Fig. 4 reference characters are used 100 higher than those used for similar structural elements in Fig. 3.

The transceiver of Fig. 4 comprises a tube 120 which may be of tube type No. 6F4 and which has cathode, grid and anode elements. A cylindrical conductor 121 is connected to the cathode, this conductor being grounded by means of a grounded slider 122. The grid of the tube is directly connected to a conductor 112b′ which is parallel to the conductor 121. The anode of the tube 120 is coupled through a D. C. blocking condenser 126 to another conductor 111b′ parallel to and of similar construction and length to the conductor 112b′. Anode voltage is supplied from a B+ source through a lead 132 which incorporates a voltage dropping and plate load resistor 135, and lead 132 extends through (but not in electrical contact with) the conductor 111b′. A high value grid leak resistor 131 is connected to the conductor 112b′ through a radio frequency choke 150, a by-pass condenser 151 further serving to keep the left end (in the drawing) of the resistor 133 at A. C. ground potential; and the other or right end of the resistor is connected to the lead 132, from which an audio utilization lead 136 extends to a headset, speaker or other transducer.

A modulating transformer designated generally at 134 includes a primary 134a which may be coupled to a conventional modulating device in the manner shown in Fig. 3, and a secondary 134b. One end of the secondary is connected to ground through a resistor 152 and the other end of the secondary is connected to the conductor 111b′ through a radio frequency choke 153.

The resonant section of a wave transmission system having only distributed parameters comprising the conductors 111b′ and 112b′ is three-eighths wavelength long and terminates in a reactive load comprising a capacitance 113b′ having a capacitive partial-reactance of the order of the characteristic impedance of the line which it terminates. A shorting bar switch 114 is adapted to short an adjustable portion of the conductors 112b′ and 111b′ to change the active length of said conductors to a quarter wavelength.

With the shorting switch 114 open as illustrated the transceiver is in receiving condition. The modulating circuit is disconnected from the grid and the transceiver operates as a superregenerative detector-amplifier. While not illustrated, an antenna may be coupled to the transceiver in the same manner as shown in Fig. 3.

If the switch 114 is closed the transceiver is switched to transmitting condition. The active length of the resonant circuit is changed to a quarter wavelength shorted section and the variable capacitance 113b′ is no longer effective. At the same time the modulating circuit is connected to the grid through the conductor 111b′ and the switch 114, thus throwing a low resistance shunt around the large grid leak resistor 133 and effectively removing said grid leak resistor from the circuit so that superregenerative operation is stopped and the circuit oscillates continuously. If desired an additional switch section may be utilized to reduce anode voltage when the transceiver is in receiving condition. Obviously this switch section may be arranged to be operated simultaneously with the switch 114 so that there is only a single control for switching the transceiver between transmitting and receiving conditions.

As in the case of the apparatus illustrated in Fig. 3 the frequency may be preset to a predetermined point, and the transceiver will transmit on this frequency, the capacitance 113b′ being out of the circuit. When the switch 114 is opened to switch the transceiver to receiving condition the short across the line is removed and the resonant circuit associated with the transceiver is tunable by means of the capacitance 113b′ independently of and without affecting the frequency at which said circuit is resonant when the transceiver is in transmitting condition. Operating circuits of the type shown in Figs. 3 and 4 may utilize components having values as follows for operation at about 465 megacycles: condenser 23, 10 micromicrofarads; condensers 26 and 126, 500 micromicrofarads; condensers 13b′ and 113b′ variable through a range from 1.6 micromicrofarads to 7.5 micromicrofarads; resistor 31, 4,000 ohms; resistors 33 and 133, 10 megohms; resistors 35 and 135, 30,000 ohms; condenser 151, 10 micromicrofarads and resistor 152, 4000 ohms. The transmission line section 11b′, 12b′ may have a characteristic impedance of 100 ohms, and the B+ voltage may be in the range from 60 to 135 volts.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A transceiver of the character described, comprising: a tube adapted to oscillate; circuit connections for providing operating voltages; a resonant circuit consisting of a section of a wave transmission system having only distributed parameters associated with said tube, said section having an input impedance with a reactive component; a variable reactor load terminating said section at one end thereof, said load having a partial-reactance of the order of and opposite to the input reactance of said section; and switching means for switching said transceiver between transmitting and receiving conditions, said switching means including a device for shorting an adjustable portion of said section to change the active length thereof.

2. A transceiver of the character described, comprising: a tube adapted to oscillate; circuit connections for providing operating voltages; a resonant circuit comprising a tunable section of a wave transmission system having only distributed parameters associated with said tube; a reactive load comprising a variable capacitance terminating said section at one end thereof for tuning said transceiver; and switching means operated by a single control for switching said transceiver between transmitting and receiving conditions, said switching means including a device for shorting an adjustable portion of said section to change the active length thereof.

3. A transceiver of the character described, comprising: a tube adapted to oscillate; circuit connections for providing operating voltages; a resonant circuit associated with said tube and comprising a transmission line section having an electrical length less than half but greater than a quarter wavelength of a given frequency; a reactive load terminating said section at one end thereof, said load comprising a capacitance having a partial-reactance of the order of the input reactance of said section; and switching means for switching said transceiver between transmitting and receiving conditions, said switching means including a device for shorting said section to change the active length thereof to a quarter wavelength of said given frequency.

4. A transceiver of the character described, comprising: a tube adapted to oscillate; circuit connections for providing operating voltages; a resonant circuit associated with said tube and comprising a transmission line section having an electrical length less than half but greater than a quarter wavelength of a given frequency; a variable reactive load terminating said section at one end thereof for tuning said section when said transceiver is in receiving condition, said load comprising a variable capacitance adapted to have a capacitive partial-reactance of the order of the input reactance of said section; and switching means operated by a single control for switching said transceiver between transmitting and receiving conditions, said switching means including a device for shorting said section to change the active length thereof to a quarter wavelength of said given frequency when said transceiver is in transmitting condition.

5. A transceiver of the character described, comprising: a tube adapted to oscillate, said tube having at least cathode, grid and anode elements; circuit connections for providing operating voltages; a resonant circuit comprising a transmission line section connected to said grid and anode elements, said line having an electrical length between one-quarter and one-half wavelength of a given frequency and terminating in a reactive load; and switching means for switching said transceiver between transmitting and receiving conditions, said switching means including a single device for shorting said section to change the active length thereof to one-quarter wavelength and for connecting at least a portion of said operating voltages to said tube.

6. A transceiver of the character described, comprising: a tube adapted to oscillate, said tube having at least cathode, grid and anode elements; circuit connections for providing operating voltages; a resonant circuit comprising a parallel conductor transmission line section having an electrical length of the order of three-eighths wavelength of a given frequency and connected to said grid and anode elements; a variable reactive load terminating said section at one end thereof for tuning said section when said transceiver is in receiving condition, said load comprising a variable capacitance adapted to have a capacitive partial-reactance of the order of the characteristic impedance of said section; means for coupling an antenna to said resonant circuit; apparatus for modulating oscillations developed by said tube; connections for utilizing received signals; and switching means for switching said transceiver between transmitting and receiving conditions, said switching means including a single device for shorting said section to change the effective length thereof to a quarter wavelength of said given frequency when said transceiver is in transmitting condition and for connecting said modulating apparatus to said tube.

7. A transceiver of the character described, comprising: a tube adapted to oscillate, said tube having cathode, grid and anode elements; circuit connections for providing operating voltages; a first resonant circuit connected to said grid and anode elements; a second resonant circuit comprising a transmission line section coupled to said first resonant circuit for controlling the operating frequency of said transceiver, said line having an electrical length between one-quarter and one-half wavelength of a given frequency and terminating in a reactive load; and switching means for switching said transceiver between transmitting and receiving conditions, said switching means including a device for changing the active length of said section to one-quarter wavelength.

8. A transceiver of the character described, comprising: a tube adapted to oscillate, said tube having cathode, grid and anode elements; circuit connections for providing operating voltages; a first resonant circuit comprising a transmission line section connected to said grid and anode elements; a second resonant circuit coupled to said first resonant circuit for controlling the operating frequency of said transceiver, said second resonant circuit comprising a parallel conductor transmission line section having a length of the order of three-eighths wavelength of a given frequency; a variable reactive load terminating said second section for tuning said section when said transceiver is in receiving condition, said load comprising a variable capacitance adapted to have a capacitive partial-reactance of the order of the characteristic impedance of said second section; and switching means operated by a single control for switching said transceiver between transmitting and receiving conditions, said switching means including a device for shorting said second section to change the effective length thereof to a quarter wavelength of said given frequency when said transceiver is in transmitting condition.

ROBERT E. SAMUELSON.

REFERENCES CITED

The following references are of record in the file of this patent:

UNITED STATES PATENTS

| Number | Name | Date |
|---|---|---|
| 2,018,569 | Pettengill et al. | Oct. 22, 1935 |
| 2,138,161 | Hansell | Nov. 29, 1938 |

(Other references on following page)

UNITED STATES PATENTS

| Number | Name | Date |
|---|---|---|
| 2,262,365 | Kinn | Nov. 11, 1941 |
| 2,405,229 | Mueller et al. | Aug. 6, 1946 |
| 2,419,564 | Keister | Apr. 29, 1947 |
| 2,515,225 | Holst et al. | July 18, 1950 |

FOREIGN PATENTS

| Number | Country | Date |
|---|---|---|
| 358,917 | Great Britain | Oct. 14, 1931 |
| 470,366 | Great Britain | Aug. 13, 1937 |
| 512,121 | Great Britain | Aug. 29, 1939 |

OTHER REFERENCES

"Practical Analysis of Ultra High Frequency," by J. R. Meagher and H. J. Markley, RCA Service Co. Inc., Camden, New Jersey, 1943.

"Principles of Radar," by members of the staff of the Radar School, MIT, 2nd edition, 2nd impression, McGraw-Hill Book Co. Inc., New York and London. 1946.